(12) United States Patent
Yue et al.

(10) Patent No.: US 8,683,071 B2
(45) Date of Patent: Mar. 25, 2014

(54) METHOD AND APPARATUS FOR SUPPORTING TIME SHIFT PLAYBACK IN ADAPTIVE HTTP STREAMING TRANSMISSION SOLUTION

(71) Applicant: Huawei Technologies Co., Ltd., Shenzhen (CN)

(72) Inventors: Peiyu Yue, Nanjing (CN); Weizhong Yuan, Shenzhen (CN); Teng Shi, Nanjing (CN); Guangyuan Liu, Shenzhen (CN); Yuanyuan Zhang, Nanjing (CN); Yonghui Tian, Nanjing (CN); Renzhou Zhang, Nanjing (CN); Lingyan Wu, Nanjing (CN); Chuxiong Zhang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/768,002

(22) Filed: Feb. 15, 2013

(65) Prior Publication Data

US 2013/0159421 A1 Jun. 20, 2013

Related U.S. Application Data

(63) Continuation of application No. PCT/CN2011/075284, filed on Jun. 3, 2011.

(30) Foreign Application Priority Data

Aug. 17, 2010 (CN) .......................... 2010 1 0255566

(51) Int. Cl.
*G06F 15/16* (2006.01)
*H04N 7/173* (2011.01)
*H04N 11/02* (2006.01)

(52) U.S. Cl.
USPC .............. 709/231; 725/86; 725/87; 725/90; 725/101; 725/112; 375/240.01; 375/240.02; 375/240.28

(58) Field of Classification Search
USPC ............... 709/231; 725/86, 87, 90, 101, 112; 375/240.12, 240.01, 240.02, 240.28
See application file for complete search history.

(56) References Cited

U.S. PATENT DOCUMENTS

| 2011/0096828 A1* | 4/2011 | Chen et al. ............... 375/240.02 |
| 2011/0231519 A1* | 9/2011 | Luby et al. .................... 709/219 |

(Continued)

FOREIGN PATENT DOCUMENTS

| CN | 101188734 A | 5/2008 |
| CN | 101459809 A | 6/2009 |

(Continued)

OTHER PUBLICATIONS

Communication from a foreign counterpart application, International Application No. PCT/CN2011/075284, English Translation, International Search Report dated Sep. 15, 2011, 4 pages.

(Continued)

*Primary Examiner* — Hoang-Vu A Nguyen-Ba
(74) *Attorney, Agent, or Firm* — Conley Rose, P.C.; Grant Rodolph; Nicholas K. Beaulieu (57) ABSTRACT

A method and an apparatus for supporting time shift playback in an adaptive HTTP streaming transmission solution are disclosed. The method includes: sending a live MPD request message to a media server; receiving a response message that includes MPD for a current time period, where the MPD further includes media presentation information for another time period; determining that a moment of a media segment to be requested currently exceeds a time range corresponding to the MPD; acquiring the corresponding MPD according to the media presentation information corresponding to the media segment, and requesting, according to the acquired corresponding MPD, the media segment. In this manner, a client supports time shift playback of a larger time range, and at the same time, the size of the MPD is capable of remaining in an acceptable range.

9 Claims, 7 Drawing Sheets

(56) References Cited

U.S. PATENT DOCUMENTS

| | | | |
|---|---|---|---|
| 2011/0231569 A1* | 9/2011 | Luby et al. | 709/234 |
| 2011/0238789 A1* | 9/2011 | Luby et al. | 709/219 |
| 2011/0239078 A1* | 9/2011 | Luby et al. | 714/752 |
| 2012/0042050 A1* | 2/2012 | Chen et al. | 709/219 |
| 2012/0042089 A1* | 2/2012 | Chen et al. | 709/231 |
| 2012/0042090 A1* | 2/2012 | Chen et al. | 709/231 |
| 2012/0198031 A1* | 8/2012 | Bouazizi | 709/219 |
| 2012/0233345 A1* | 9/2012 | Hannuksela | 709/231 |
| 2013/0007223 A1* | 1/2013 | Luby et al. | 709/219 |

FOREIGN PATENT DOCUMENTS

| | | |
|---|---|---|
| CN | 101552796 A | 10/2009 |
| CN | 101588473 A | 11/2009 |
| CN | 102055773 A | 5/2011 |
| CN | 102055789 A | 5/2011 |

OTHER PUBLICATIONS

"HTTP streaming—text changes to S4-100085," Tdoc S4-AHI176, http://www.3gpp.org/ftp/tsg_sa/WG4_CODEC/Ad-hoc_MBS/Docs_AHI, Mar. 2009, 14 pages.

"3rd Generation Partnership Project; Technical Specification Group Services and System Aspects; Transparent end-to-end Packet-switched Streaming Service (PSS); Protocols and Codecs (Release 9)," 3GPP TS 26.234 V9.2.0, Mar. 2010, 176 pages.

"3rd Generation Partnership Project; Technical Specification Group Services and System Aspects; Transparent end-to-end Packet-switched Streaming Service (PSS); Protocols and Codecs (Release 9)," 3GPP TS 26.234 V9.4.0, Sep. 2010, 187 pages.

Foreign Communication From a Counterpart Application, PCT Application PCT/CN2011/075284, Translation of Written Opinion dated Sep. 15, 2011, 6 pages.

Foreign Communication From a Counterpart Application, Chinese Application 201010255566.0, Chinese First Search Report dated Aug. 10, 2012, 2 pages.

Foreign Communication From a Counterpart Application, Chinese Application 201010255566.0, Chinese First Office Action dated Aug. 23, 2012, 4 pages.

Foreign Communication From a Counterpart Application, Chinese Application 201010255566.0, Partial Translation of First Chinese Office Action dated Aug. 23, 2012, 4 pages.

Foreign Communication From a Counterpart Application, European Application No. 11786124.5, Extended European Search Report dated Aug. 19, 2013, 8 pages.

"Format for HTTP Streaming Media Presentation Description," 3GPP SA4-MBS SWG on MBS_Ext, Tdoc S4-100020, RealNetworks Inc., Telefon AB LM Ericsson, St-Ericsson SA, XP050437753, Jan. 25-29, 2010, 11 pages.

"Change Request," 3GPP TSG-SA4 #58, S4-100355, Rev 2, Version 9.2.0, Vancouver, Canada, XP050437994, Apr. 26-30, 2010, 32 pages.

"Data Format for HTTP-Streaming Media Description," RealNetworks, 3GPP SA4-MBS SWG on MBS_Ext, Tdoc S4-AHI139, XP050637289, Issy Les Moulineaux, France, Dec. 14-16, 2009, 5 pages.

* cited by examiner

METHOD AND APPARATUS FOR SUPPORTING TIME SHIFT PLAYBACK IN ADAPTIVE HTTP STREAMING TRANSMISSION SOLUTION

CROSS-REFERENCE TO RELATED APPLICATIONS

This application is a continuation of International Application No. PCT/CN2011/075284, filed on Jun. 3, 2011, which claims priority to Chinese Patent Application No. 201010255566.0, filed on Aug. 17, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the communications technology field, and in particular, to a method and an apparatus for supporting time shift playback in an adaptive Hypertext Transfer Protocol (HTTP) streaming transmission solution.

BACKGROUND

There are multiple manners for a user to use a terminal device to acquire and play multimedia content. Typical manners are a manner of downloading the multimedia content to a local disk over a HTTP file download or a Peer-to-Peer (P2P) file download and then playing the multimedia content, a traditional streaming media manner (e.g., Real-time Transfer Protocol (RTP)/Real-time Transfer Protocol Control Protocol (RTCP) for data transmission and Real-time Streaming Protocol (RTSP) for play control), online live broadcast/ Video on Demand over P2P streaming media manner, HTTP progressive download, and the like. Based on the HTTP progressive download, an enhanced streaming media transmission manner based on an HTTP protocol is developed, which is referred to as the HTTP streaming transmission solution. This solution supports dynamic bit rate adaptation, that is, it is capable of dynamically selecting, according to the available bandwidth between a client and a server, a media segment with a bit rate matching the available bandwidth in real time during a playing process, so as to provide a user with high-quality play experience. Therefore, this solution is also referred to as HTTP adaptive streaming (HAS) or adaptive HTTP streaming. In the 3rd Generation Partnership Project (3GPP) SA4 R9 standard, the HTTP adaptive streaming solution may further be classified into a static mode and a dynamic mode according to content-preparation modes. In the static content preparation mode, media content transmitted over HTTP serves as static content, and an HTTP server does not need to prepare content in any manner because content preparation is completed in advance; in the dynamic content service mode, the HTTP streaming server dynamically tailors streaming content for the client based on a request of the client.

During a live broadcast process, as a media segment for a following time period has not been generated yet, a media presentation description (MPD) or a playlist (for brevity, only the MPD is mentioned subsequently, but the description also applies to the playlist) cannot include acquisition information, such as a Uniform Resource Locator (URL), of the media segment for the following time period. However, if related information, such as the content encoding format, encapsulation format, resolution, bit rate, and language, of the media segment for the following time period is known, and a corresponding URL address for acquisition can be allocated in advance for a media segment for a short following time period, it is possible to provide description information of the media segment for the following time period in advance. However, content with another source may need to be inserted subsequently during the live broadcast and the accurate end time point of the live broadcast may not be known. Therefore, media presentation description information for a long following time period cannot be provided. This brings the following problem: it is probable that the media presentation description information for the following time period for live media presentation cannot be provided all at once like Video on Demand content when being accessed by the client, and the media presentation description information for the following time period needs to be gradually added in the MPD as time goes on. In this manner, the client needs to continuously acquire updated MPD to obtain the media presentation description information for the following time period and thereby has a corresponding URL to acquire a media segment and play the media segment.

The MPD may be updated in two manners. (a) Enable the MPD to include the media presentation description information for all time periods (time-line) since the live broadcast starts. This manner brings the problem that as time goes on, the MPD includes a longer time period and accordingly the MPD includes more description information. In this case, the size of the MPD increases gradually and the client needs to acquire MPD larger than the previous MPD each time requesting updated MPD. Therefore, this manner is comparatively applicable to live media presentation of a short duration. (b) Perform an update in sliding window mode: enable updated MPD to include only the description information of a media segment for a time period close to the current time point. For example, typically, only media presentation description information for the latest 10 minutes to 1 hour may be included, and media presentation description information exceeding the time period is not included in the updated MPD. In this manner, if accessing when the live broadcast starts, the client locally creates a playlist and sequentially adds time periods included in subsequent updated MPDs to the local playlist, so as to obtain a complete playlist with the time period when the live broadcast starts to the time period included in the current MPD, thereby achieving the same effect as manner (a). In manner (b), if the client accesses at a certain time point after the live broadcast starts, an updated MPD that it acquires includes only the media presentation description information for a time period close to the access time point and may not include the media presentation description information for the time period when the live broadcast starts. In this case, the client cannot seek back to an earlier time point (for example, the time shift or playback function). Therefore, when providing MPD, the HTTP streaming server needs to determine the duration of a time period of the media description information included in the MPD. The total duration of time periods included in the MPD may affect behaviors of performing play/pause and Seek operations by the client in a live broadcast session. A longer total duration of the time periods indicates a longer playlist included, a longer time period in which the client is capable of performing a pause operation without losing its location in the live broadcast playlist, and a larger time range that the client is capable of seeking. However, if MPD including a longer total duration of time periods is determined, a higher network load is brought. As the client needs to update the MPD frequently, although the size of each MPD file is generally small, the accumulation of each update is considerable.

SUMMARY

Embodiments of the present invention provide a method and apparatus for supporting time shift playback in an adaptive HTTP streaming transmission solution.

A method for supporting time shift playback in an adaptive HTTP streaming transmission solution includes: sending a live MPD request message to a media server; receiving a response message returned from the media server that comprises MPD for a current time period, wherein the MPD comprises media presentation information for another time period; determining that a moment of a media segment to be requested currently exceeds a time range corresponding to the MPD, and determining, according to the media presentation information for another time period, the media presentation information corresponding to the media segment to be requested currently; and acquiring the corresponding MPD according to the media presentation information corresponding to the media segment to be requested currently, and requesting, from the media server according to the acquired MPD, the media segment to be requested currently.

Another method for supporting time shift playback in an adaptive HTTP streaming transmission solution includes: receiving a live MPD request message sent by a client; sending a response message that comprises MPD for a current time period to the client, wherein the MPD comprises media presentation information for another time period; receiving an MPD request message for another time period exceeding a time period corresponding to the MPD, wherein the MPD request message is sent by the client; and sending, according to the media presentation information, MPD, corresponding to the media presentation information to the client, so that the client acquires a corresponding media segment according to the MPD corresponding to the media presentation information.

A client includes: a sending module configured to send an MPD request message to a media server; a receiving module configured to receive a response message returned from the media server that comprises MPD for a current time period, wherein the MPD further comprises media presentation information for another time period; a determining module configured to determine that a moment of a media segment to be requested currently exceeds a time range corresponding to the MPD, and determine, according to the media presentation information for another time period, the media presentation information corresponding to the media segment to be requested currently; and an acquiring module configured to acquire the corresponding MPD according to the media presentation information corresponding to the media segment to be requested currently, and request, from the media server according to the acquired MPD, the media segment to be requested currently.

A media server includes: a receiving module configured to receive an MPD request message sent by a client; and a sending module configured to send a response message that comprises MPD for a current time period to the client, wherein the response message comprises media presentation information for another time period, and send, according to the media presentation information, MPD, corresponding to the media presentation message to the client, so that the client acquires a corresponding media segment according to the corresponding MPD.

DETAILED DESCRIPTION

Embodiment 1

Figure 1:
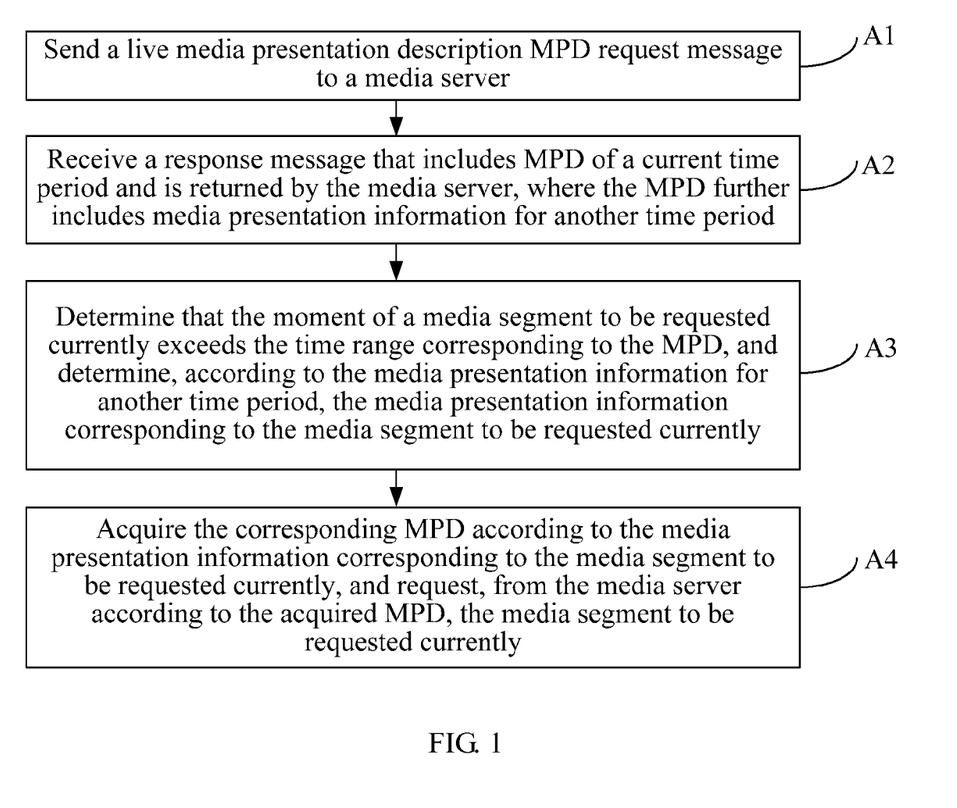
FIG. 1 is a flow chart of a method for supporting time shift playback in an adaptive HTTP streaming transmission solution according to an embodiment of the present invention.

Referring to FIG. 1, Embodiment 1 of the present invention provides a method for supporting time shift playback or seamless switching between a live broadcast and Video on Demand in an adaptive HTTP streaming transmission solution. The method includes:

A1: Send a live MPD request message to a media server.

A client requests live MPD, for example, according to a URL address for acquiring the live MPD. The MPD is updated frequently, and therefore this step may be repeated multiple times as required. The client may be disposed in a mobile terminal, a set-top box, or other user equipment receiving media streams.

A2: Receive a response message that includes MPD for a current time period and is returned by the media server, where the MPD further includes media presentation information for another time period.

Assume that the current time period is a time interval [a, b]. The media server returns the currently latest MPD. The client processes the MPD to obtain a corresponding playlist and acquires the URL address of a media segment. The MPD further includes media presentation information for another time period. The another time period herein may be classified into two cases:

(1) The client creates a local playlist completely based on the latest MPD currently acquired. In this case, a time period out of the time interval [a, b], for example, a time period before time point "a" for live broadcast, included in the current MPD, is referred to as another time period; and (2) The client creates a local playlist based on the latest MPD currently acquired, and further based on a time period included in an MPD previously acquired. A client that accesses after the live broadcast starts is capable of creating a playlist of all time periods within a range from the first MPD it received to the currently latest MPD it receives. Assuming that the range is the time interval [a', b] (wherein a'≤a), a time period out of the time interval [a', b] (for example, <a') is referred to as another time period. In another example, a live broadcast client had accessed when the live broadcast started, but a local playlist it maintains has a restriction on the total duration (for example, LocalListDuration). In this case, the time period it maintains is [b-LocalListDuration, b], and a time period out of this time period is referred to as another time period.

A3: Determine that the moment of a media segment to be requested currently exceeds the time range corresponding to the MPD, and determine, according to the media presentation information for another time period, the media presentation information corresponding to the media segment to be requested currently.

The client first judges whether the moment of the requested media segment exceeds the current time range. For example, the time range of the playlist maintained by the client is [a, b], and if the start time of the requested media segment is c (c<a), the moment of the media segment exceeds the time range; if the start time of the requested media segment is d (a≤d≤b), the moment of the media segment does not exceed the time range. The client judges whether the MPD provides the media presentation information corresponding to a time period that includes the moment of the requested media segment. For example, for time point c that exceeds the time range, if time range [e, f] covered by media presentation information in the MPD exists and the condition e≤c≤f is satisfied, it is considered that such media presentation information exists. An example of actual application may further include judging whether multiple pieces of media presentation information corresponding to the time period that includes the moment of the requested media segment exist in the MPD. If yes, the client may select one from the multiple pieces of media presentation information according to a selection policy. In an example of actual application, the selection policy may include one or a combination of the following cases: (1) if the MPD information further includes availability time (for example, availablilityStart; availabilityEnd is optional), the current time needs to satisfy the requirement of the availability time; (2) if time periods included in the media presentation information overlap, the piece of media presentation information corresponding to the MPD time period with the lowest overlap ratio to the time period of the local playlist maintained by the client may be selected; (3) if time periods of several MPDs do not overlap with the time period of the local playlist or the overlap ratios of time periods of several MPDs to the time period of the local playlist are the same, a piece of media presentation information may be selected randomly, for example, the first piece of media presentation information that satisfies the condition, the piece of media presentation information whose start time is the closest to the time of the requested media segment, or the piece of media presentation information whose start time has a greatest time difference from the current time; and (4) another possible selection policy.

A4: Acquire, according to the media presentation information, the MPD corresponding to the media segment to be requested currently, and request, from the media server according to the acquired MPD, the media segment to be requested currently.

The client acquires the URL address of the MPD from the media presentation information and requests the MPD for the corresponding time period from the server; and the server returns the corresponding MPD. The client processes the acquired MPD to obtain a corresponding playlist and the URL address of the media segment, and adds (or replaces) the obtained playlist to the playlist locally maintained. The client requests the media segment corresponding to the MPD, constructs a media segment request, and sends it to the server. The following steps may further be included: the client receives the media segment corresponding to the request and is returned by the server; and the client sequentially requests media segments following this media segment until a user performs another play control operation, all media segments in the playlist are requested and played, or an MPD update occurs.

In Embodiment 1, a live MPD request message is sent to a media server; a response message that includes the MPD for the current time period and is returned by the server is received, where the MPD further includes media presentation information for another time period; a media segment to be requested currently is determined to exceed the time range corresponding to the MPD, and the media presentation information corresponding to the media segment to be requested currently is determined according to the MPD information for another time period; the corresponding MPD is acquired according to the media presentation information corresponding to the media segment to be requested currently and includes the URL address of the required MPD, and the media segment to be requested currently is requested from the media server according to the acquired corresponding MPD.

In this manner, the client supports time shift and playback of a larger time range, and at the same time, the size of the MPD is capable of remaining in an acceptable range.

Embodiment 2

Figure 2:
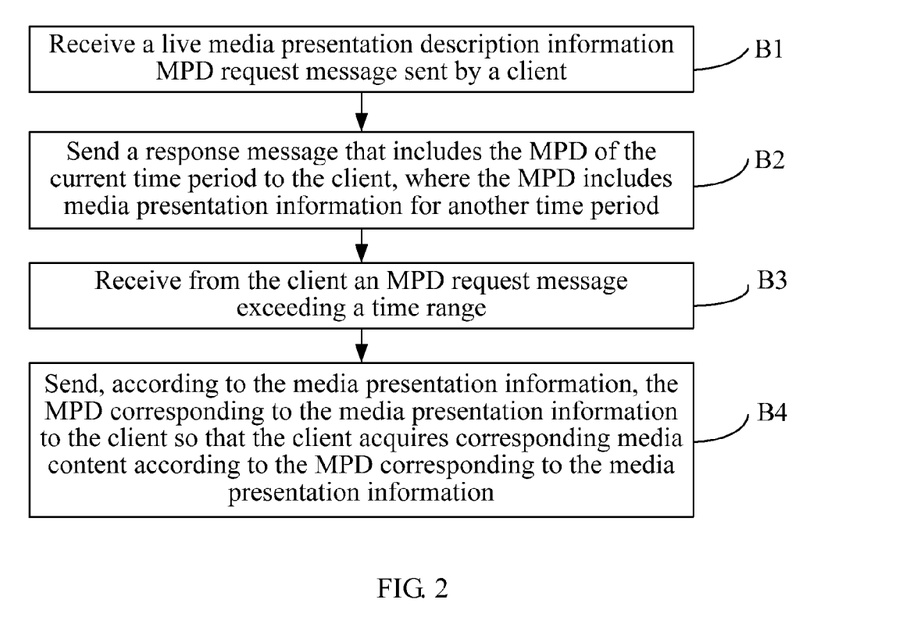
FIG. 2 is a flow chart of a method for supporting time shift playback in an adaptive HTTP streaming transmission solution according to an embodiment of the present invention.

Referring to FIG. 2, Embodiment 2 of the present invention provides a method for supporting time shift playback or seamless switching between live broadcast and Video on Demand in an adaptive HTTP streaming transmission solution. The method includes:

B1: Receive a live MPD request message sent by a client.

The MPD is updated frequently, and therefore this step may be repeated multiple times as required.

B2: Send a response message that includes the MPD for the current time period to the client, where the MPD includes media presentation information for another time period.

This step has been described in detail in step A2, and therefore details are not provided herein.

B3: Receive from the client an MPD request message exceeding a time range.

The client acquires the URL address of the MPD from the media presentation information, and requests the MPD for a corresponding time period from the server.

B4: Send the corresponding MPD to the client according to the MPD request message of the client, so that the client acquires a required media segment according to the corresponding MPD.

This step has been described in detail in step A4, and therefore details are not provided herein.

In Embodiment 2, a live MPD request message sent by a client is received; a response message that includes the MPD for the current time period is sent to the client, where the MPD further includes media presentation information for another time period; an MPD request message exceeding a time range is received from the client; the corresponding MPD is sent to the client according to the MPD request message of the client, so that the client acquires a required media segment according to the corresponding MPD. In this manner, the client supports time shift and playback of a larger time range, and at the same time, the size of the MPD is capable of remaining in an acceptable range.

Embodiment 3

Figure 3:
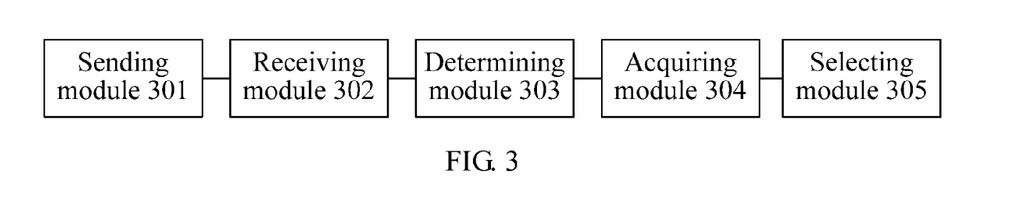
FIG. 3 is a basic block diagram of a client according to an embodiment of the present invention.

Referring to FIG. 3, Embodiment 3 of the present invention provides a client, where the client may be disposed in a user equipment (for example, a mobile terminal or a fixed set-top box), and the client includes a sending module 301, a receiving module 302, a determining module 303, and an acquiring module 304.

The sending module 301 is configured to send a live MPD request message to a media server to request acquisition of a live MPD, for example, according to a URL address for acquiring the live MPD. The MPD is updated frequently, and therefore this step may be repeated multiple times as required.

The receiving module 302 is configured to receive a response message that includes the MPD for the current time period and is returned by the media server, where the MPD further includes media presentation information corresponding to another time period; this step has been described in detail in step A2, and therefore details are not provided herein.

The determining module 303 is configured to determine that the moment of a media segment to be requested currently exceeds the time range corresponding to the MPD, and determine, according to the media presentation information for another time period, the media presentation information corresponding to the media segment to be requested currently; this step has been described in detail in step A3, and therefore details are not provided herein.

The acquiring module 304 is configured to acquire the corresponding MPD according to the media presentation information corresponding to the media segment to be requested currently, and request, from the media server according to the acquired corresponding MPD, the media segment to be requested currently. This step has been described in detail in step A4, and therefore details are not provided herein.

In an example of actual application, the client may further include a selecting module 305 configured to judge whether multiple pieces of media presentation information corresponding to a time period that includes the moment of the requested media segment exist in the MPD. If yes, the client may select one from the multiple pieces of media presentation information according to a selection policy. The specific selection policy includes one or a combination of the following: if the media presentation information includes availability time, the current time needs to satisfy the requirement of the availability time; if time periods corresponding to the media presentation information overlap, the MPD that includes the time period with the lowest overlap ratio to the time period of the local playlist maintained by the client may be selected; and if time periods of several MPDs do not overlap with the time period of the local playlist or the overlap ratios of time periods of several MPDs to the time period of the local playlist are the same, a piece of media presentation information may be selected randomly.

In Embodiment 3, a sending module 301 sends a live MPD request message to a media server; a receiving module 302 receives a response message that includes the MPD for the current time period and is returned by the server; a determining module 303 determines that a media segment to be requested currently exceeds the time range corresponding to the MPD, and determines, according to media presentation information for another time period, the media presentation information corresponding to the media segment to be requested currently; and an acquiring module 304 acquires the corresponding MPD according to the media presentation information corresponding to the media segment to be requested currently, and requests, from the media server according to the acquired corresponding MPD, the media segment to be requested currently. In this manner, the client supports time shift and playback of a larger time range, and at the same time, the size of the MPD is capable of remaining in an acceptable range.

Embodiment 4

Figure 4:
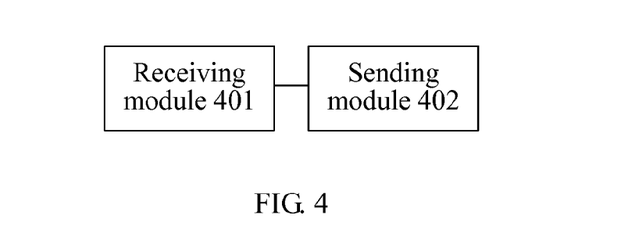
FIG. 4 is a basic block diagram of a media server according to an embodiment of the present invention.

Referring to FIG. 4, Embodiment 4 of the present invention provides a media server. The media server includes a receiving module 401 and a sending module 402.

The receiving module 401 is configured to receive a live MPD request message sent by a client. The MPD is updated frequently, and therefore this step may be repeated multiple times as required. The receiving module 401 is further configured to receive an MPD request message sent by the client. When the client acquires the URL address of the MPD from the MPD information returned by the server, and stores the URL address, the receiving module 401 receives a request for the MPD for a corresponding time period.

The sending module 402 is configured to send a response message that includes the MPD for the current time period to the client, where the MPD further includes media presentation information for another time period. This step has been described in detail in step A2, and therefore details are not provided herein. The sending module 402 is further configured to send the MPD corresponding to the MPD request message to the client according to the MPD request message sent by the client, so that the client acquires the corresponding media content according to the MPD. This step has been described in detail in step A4, and therefore details are not provided herein.

In Embodiment 4, a receiving module 401 receives a live media presentation description information request message sent by a client; a sending module 402 sends a response message that includes the MPD for the current time period to the client, where the response message includes media presentation information for another time period; the receiving module 401 receives a media presentation information request message sent by the client; and the sending module 402 sends the MPD corresponding to the MPD request message to the client according to the MPD request message, so that the client acquires the corresponding media content according to the MPD. In this manner, the client supports time shift and playback of a larger time range, and at the same time, the size of the MPD is capable of remaining in an acceptable range.

Embodiment 5

Figure 5:
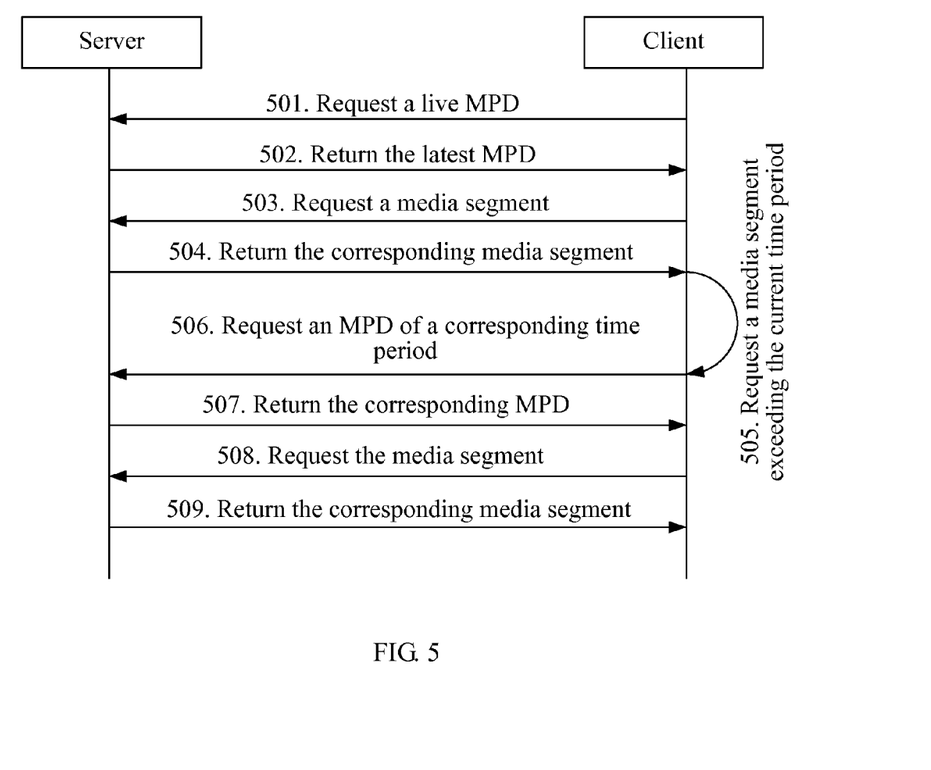
FIG. 5 is a flow chart of specific implementation of a method for supporting time shift playback in an adaptive HTTP streaming transmission solution according to an embodiment of the present invention.

Referring to FIG. 5, the embodiment of the present invention provides a method for more efficiently supporting time shift in an adaptive HTTP streaming transmission solution, involving a client and a media server. The specific steps are as follows:

501: The client sends a live MPD request message to the media server.

The client requests acquisition of a live MPD, for example, constructs a request message according to the URL address of the live MPD; and sends the constructed MPD request message to the media server.

502: The server returns the currently latest MPD.

At the same time, the MPD further includes media presentation information for another time period. Another time period herein may be classified into two cases:

(1) The client creates a local playlist completely based on the latest MPD currently acquired. In this case, a time period out of the time interval [a, b], for example, a time period before time point "a" for live broadcast, included in the current MPD, is referred to as another time period; and (2) the client creates a local playlist based on the latest MPD currently acquired, and further based on a time period included in an MPD previously acquired. A client that accesses after the live broadcast starts is capable of creating a playlist of all time periods within a range from the first MPD it received to the currently latest MPD it receives. Assuming that the range is the time interval [a', b] (wherein a'≤a), a time period out of the time interval [a', b] (for example, <a') is referred to as another time period. In another example, a live broadcast client had accessed when the live broadcast started, but a local playlist it maintains has a restriction on the total duration (for example, LocalListDuration). In this case, the time period it maintains is [b-LocalListDuration, b], and a time period out of this time period is referred to as another time period.

503: The client requests a media segment from the server.

The client processes the MPD to obtain a corresponding playlist and acquire the URL address of a media segment, and requests the media segment from the server according to the URL address.

504: The server returns the media segment corresponding to the request to the client.

Herein, steps 501 and 502 and steps 503 and 504 may be repeated multiple times according to the implementation situation.

505: The client requests a media segment that is in a time shift range but not included in the current MPD, and determines, according to the media presentation information for another time period, the media presentation information corresponding to the media segment to be requested currently.

Figure 6:
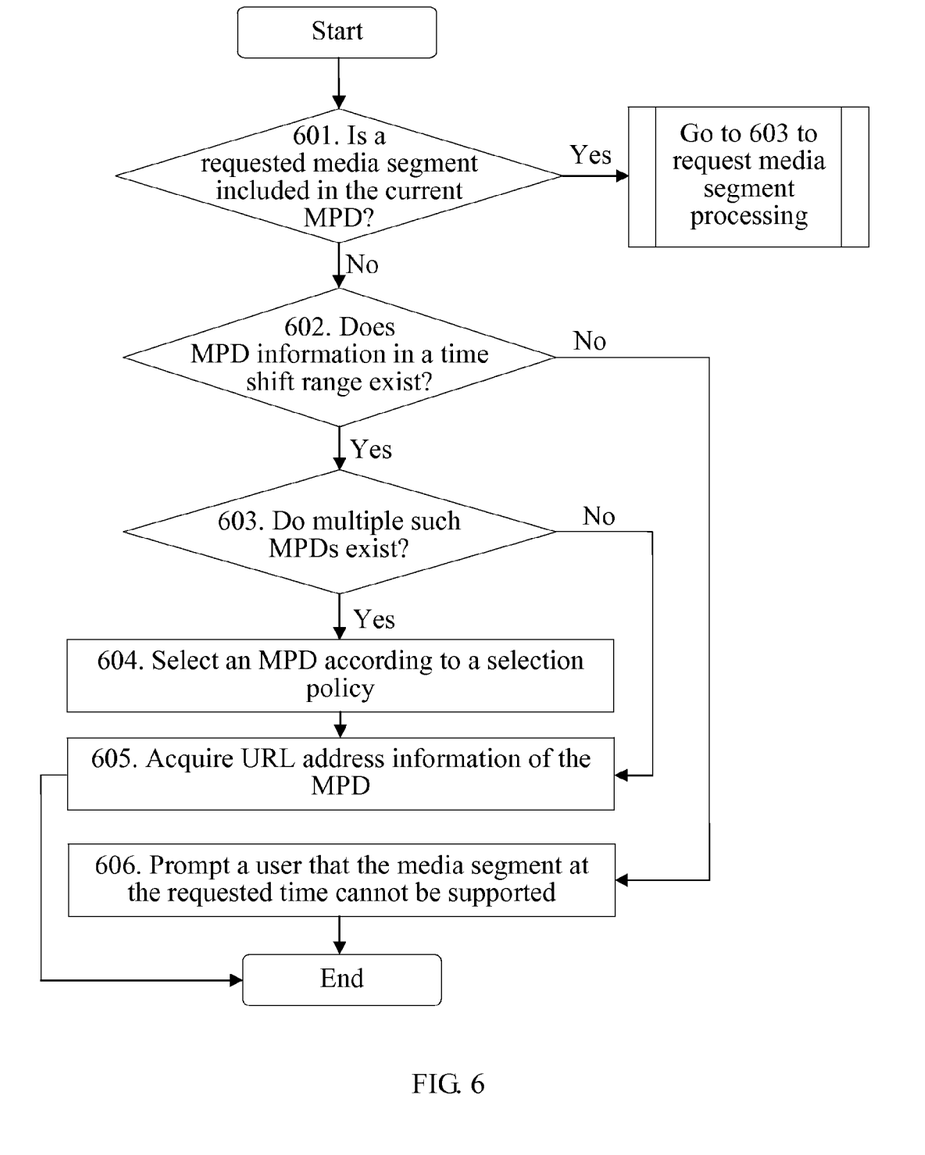
FIG. 6 is a flow chart of specific implementation of a method for supporting time shift playback exceeding a time shift range in an adaptive HTTP streaming transmission solution according to an embodiment of the present invention.

As shown in FIG. 6, when the client requests a media segment for a time period that is in the time shift range supported by a live broadcast server but not included in the currently latest MPD, for example, the current MPD includes only media presentation description information for the latest 10 minutes, but the client wants to start watching at the time point 20 minutes earlier than the current time, the existing technical solution fails to be implemented for a client that creates a playlist only based on the current MPD or a client that is capable of creating a playlist according to all received MPDs but just accesses the live broadcast.

601: The client judges whether the requested media segment is included in the current MPD (or judges whether the requested media segment is included in the local playlist in a situation where the local playlist is created not only based on the current updated MPD). For example, the time range of the playlist maintained by the client is [a, b]. If the start time of the requested media segment is c (c<a), the requested media segment exceeds the time range; and if the start time of the requested media segment is d (a≤d≤b), the requested media segment does not exceed the time range.

602: Judge whether the MPD provides media presentation information for another time period that is in the time shift range but not included in the current MPD. For example, for time point c that exceeds the time range of the current MPD, if time range [e, f] covered by media presentation information exists and the condition e≤c≤f is satisfied, it is considered that the MPD provides such media presentation information, and the following process is continued; otherwise, it is considered that MPD information satisfying the condition is not provided, and the client prompts the user that the media segment at the requested time cannot be supported 606.

603: Judge whether multiple pieces of media presentation information corresponding to the time period that includes the moment of the requested media segment exist in the MPD. If yes, the client selects one from the multiple pieces of media presentation information according to a selection policy 604. This may be classified into multiple cases: (1) If the MPD information further includes availability time (for example, availablilityStart; availabilityEnd is optional), the current time needs to satisfy the requirement of the availability time; (2) if time periods overlap between MPDs, the MPD that includes the MPD time period with the lowest overlap ratio to the time period of the local playlist maintained by the client may be selected; (3) if time periods of several MPDs do not overlap with the time period of the local playlist or the overlap ratios of time periods of several MPDs to the time period of the local playlist are the same, a piece of media presentation information may be selected randomly, for example, the first piece of media presentation information that satisfies the condition, the piece of media presentation information whose start time is the closest to the time of the requested media segment, or the piece of media presentation information whose start time has a greatest time difference from the current time; and (4) another possible selection policy.

For example, the currently latest MPD includes media presentation description information for 10 minutes from 50 minutes to 60 minutes after the live broadcast starts, and the live broadcast server supports a duration of 30 minutes for time shift. In this case, an example where additional MPD information included in the MPD is provided using Extensible Markup Language (XML) element <previousMPD> and media presentation information for another time period from 30 minutes to 50 minutes after the live broadcast starts is provided as follows:

```
<previousMPD>
<MPDInfo>
        <interval>
                <startTime>PT30M</startTime>
                <endTime>PT50M</endTime>
        </interval>
        <MPDAddress>http://www.movie.com/Experience/
        exampleLive_preMPD_URL.mpd</MPDAddress>
</MPDInfo>
</previousMPD>
```

Alternatively, each MPD for previous time periods includes only media presentation description information for a 10-minute time period, and therefore information of two previous MPDs needs to be included. An example is as follows:

```
<previousMPD>
<MPDInfo>
        <interval>
                <startTime>PT30M</startTime>
                <endTime>PT40M</endTime>
        </interval>
        <MPDAddress>http://www.movie.com/Experience/
        exampleLive_preMPD1_URL.mpd</MPDAddress>
</MPDInfo>
<MPDInfo>
```

-continued

```
    <interval>
        <startTime>PT40M</startTime>
        <endTime>PT50M</endTime>
    </interval>
    <MPDAddress>http://www.movie.com/Experience/
    exampleLive_preMPD2_URL.mpd</MPDAddress>
    </MPDInfo>
</previousMPD>
```

605: The client acquires the URL address of the corresponding MPD according to the media presentation information.

506: The client requests the MPD for the corresponding time period from the server according to the URL address of the MPD obtained in step 505.

The client requests the MPD for the corresponding time period from the server according to the URL address of the MPD obtained in step 505.

507: The server returns the MPD corresponding to the request to the client.

The client processes the received MPD to obtain a corresponding playlist and acquires the URL address of the media segment, and adds the obtained playlist to the playlist locally maintained (or replaces the playlist locally maintained).

508: The client requests the media segment from the server.

The client first constructs a corresponding media segment request according to the moment of the media segment to be requested in step 505, and sends it to the server.

509: The server returns the corresponding media segment to the client.

The server returns the media segment corresponding to the request.

Then, the client may sequentially request media segments following this media segment until the user performs another play control operation, all media segments in the local playlist are requested and played, or an MPD update occurs. Steps 508 and 509 may be repeated multiple times according to the implementation situation.

In Embodiment 5, a live MPD request message is sent to a media server; a response message that includes the MPD for the current time period and is returned by the server is received, where the MPD further includes media presentation information for another time period in a time shift range; a media segment to be requested currently is determined to exceed the time range corresponding to the MPD, and the media presentation information corresponding to the media segment to be requested currently is determined according to the media presentation information for another time period; the corresponding MPD is acquired according to the media presentation information corresponding to the media segment to be requested currently, and the media segment to be requested currently is requested from the media server according to the acquired corresponding MPD. In this manner, the live broadcast server supports time shift of a longer time period while only media presentation description information for a small part of time periods needs to be included in the MPD, and information such as that for acquiring MPD, including description information of media segments of other time periods, is included in media presentation information. When necessary, the client may acquire MPD for a corresponding time period using the media presentation information. In this manner, time shift and playback of a larger time range are supported, and at the same time, the size of the MPD is capable of remaining in an acceptable range.

In the preceding embodiment, media presentation information for another time period that is in the live broadcast time shift range but not included in the currently latest MPD is provided in the MPD. In this manner, the MPD provided by the live broadcast server supports time shift of a comparatively large time range, and at the same time, the MPD does not need to include media presentation description information for all time periods in the time shift duration, thereby supporting time shift of a larger time range while not significantly increasing the size of the MPD and network overhead of client processing, for example, reducing network load for the client to update the MPD. In this embodiment, the live broadcast server may provide a required MPD for a previous time period and a corresponding media segment, and a content preparation server provides the additional MPD information in an updated MPD.

Embodiment 7

When a client plays back media content of a time period exceeding the time shift range of a server, a live broadcast server may fail to provide media content exceeding its maintained time shift range, and a Video on Demand (VoD) server needs to provide a media segment exceeding the time shift range. In addition, in this situation, live broadcast is not completed. Therefore, a complete Video on Demand service of corresponding media presentation cannot be provided temporarily. In this situation, the part that has been broadcast may be divided according to duration to provide several different Video on Demand programs, and MPD acquisition information of the Video on Demand programs may be included in the MPD. The client may perform seamless switching from the live broadcast to Video on Demand according to the MPD acquisition information of these Video on Demand programs.

Figure 7:
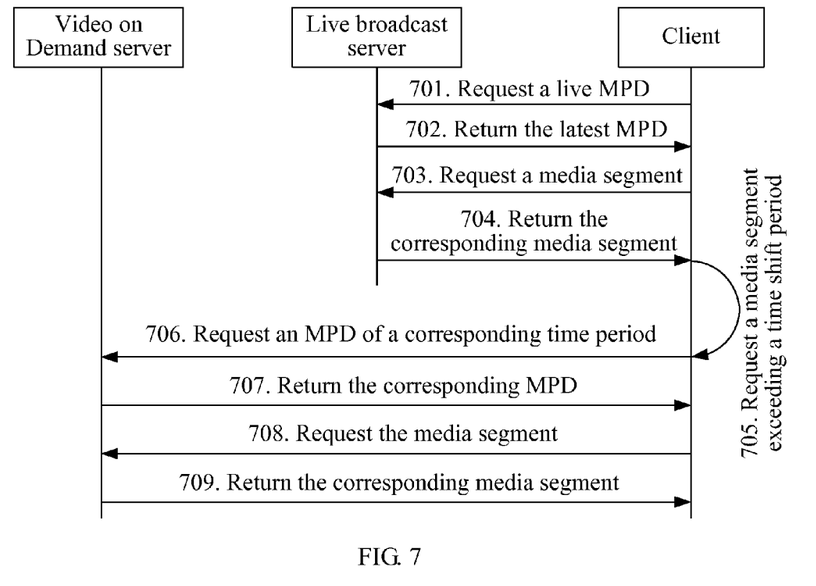
FIG. 7 is a flow chart of specific implementation of a method for seamless switching between live broadcast and Video on Demand in an adaptive HTTP streaming transmission solution according to an embodiment of the present invention.

Referring to FIG. 7, the embodiment of the present invention provides a method for seamless switching between live broadcast and Video on Demand in an adaptive HTTP streaming transmission solution, involving a client, a live broadcast server, and a Video on Demand server. The specific steps are as follows:

701: The client sends a live MPD request message to the live broadcast server.

The client requests acquisition of a live MPD, for example, constructs an MPD request message according to a URL address for acquiring the live MPD.

702: The live broadcast server returns the currently latest MPD.

At the same time, the MPD further includes MPD information for another time period. Another time period herein may be classified into two cases:

(1) The client creates a local playlist completely based on the latest MPD currently acquired. In this case, a time period out of the time interval [a, b], for example, a time period before time point "a" for live broadcast, included in the current MPD, is referred to as another time period; and (2) the client creates a local playlist based on the latest MPD currently acquired, and further based on a time period included in an MPD previously acquired. A client that accesses after the live broadcast starts is capable of creating a playlist of all time periods within a range from the first MPD it received to the currently latest MPD it receives. Assuming that the range is the time interval [a', b] (wherein a'≤a), a time period out of the time interval [a', b] (for example, <a') is referred to as another time period. In another example, a live broadcast client had accessed when the live broadcast started, but a local playlist it maintains has a restriction on the total duration (for example, LocalListDuration). In this case, the time period it maintains is [b-LocalListDuration, b], and a time period out of this time period is referred to as another time period.

703: The client requests a media segment from the live broadcast server.

The client processes the live MPD to obtain a corresponding playlist and acquire the URL address of a media segment, and requests the media segment according to the URL address.

704: The live broadcast server returns the media segment to the client.

Herein, steps 701 and 702 and steps 703 and 704 may be repeated multiple times according to the implementation situation.

705: When requesting a media segment exceeding the time shift duration range that is supported by the live broadcast server, the client determines, according to media presentation information of a Video on Demand MPD for another time period exceeding the time shift range and including the moment of the media segment to be requested, the media presentation information corresponding to the media segment to be requested currently, where the media presentation information of the Video on Demand MPD is provided in the MPD; when the client needs to playback a media segment of another time period exceeding the live broadcast time shift range, the live broadcast server may fail to provide the media segment exceeding its maintained time shift range, and the corresponding Video on Demand server needs to provide the media segment exceeding the live broadcast time shift range. However, in this situation, the live broadcast is not completed. Therefore, a complete Video on Demand service of corresponding media presentation cannot be provided temporarily. In this situation, the part that has been broadcast may be divided according to duration to provide several different Video on Demand programs, and media presentation information of the Video on Demand programs may be included in the live MPD. The client may perform seamless switching from the live broadcast to Video on Demand according to the media presentation information of these Video on Demand programs.

The client judges whether the MPD provides media presentation information of a Video on Demand MPD for another time period exceeding the time shift range and including the moment of the media segment to be requested, and if no media presentation information satisfying the condition is provided, prompts the user that the media segment at the requested time cannot be supported; if media presentation information satisfying the condition exists, the client judges whether multiple pieces of media presentation information satisfying the condition exist in the live MPD. If multiple pieces of media presentation information satisfying the condition exist, the client selects one from the multiple pieces of media presentation information according to the selection policy. This may be classified into multiple cases: (1) if the media presentation information further includes availability time (for example, availablilityStart; availabilityEnd is optional), the current time needs to satisfy the requirement of the availability time (for example, Video on Demand presentation including a complete program cannot be provided before the live broadcast is completed, and therefore the requirement of its availability time cannot be satisfied at present); (2) if time periods corresponding to multiple pieces of media presentation information overlap, the piece of media presentation information corresponding to the time period with the lowest overlap ratio to the time period of the local playlist maintained by the client may be selected; (3) if time periods corresponding to several pieces of media presentation information do not overlap with the time period of the local playlist or the overlap ratios of time periods corresponding to several pieces of media presentation information to the time period of the local playlist are the same, a piece of media presentation information may be selected randomly, for example, the first piece of media presentation information that satisfies the condition, the piece of media presentation information whose start time is the closest to the time of the requested media segment, or the piece of media presentation information whose start time has a greatest time difference from the current time; and (4) another possible selection policy.

The client acquires the corresponding URL address of the Video on Demand MPD. The client may further acquire the corresponding Video on Demand MPD using the acquired URL.

In an embodiment, assume that the live broadcast server provides 30-minute time shift duration. If content of a time period prior to the 30-minute time shift duration also needs to be provided in Video on Demand mode, an example where included additional media presentation information may be provided using XML element <relatedVoD>, and after the live broadcast is performed for 90 minutes, Video on Demand media presentation information for the time period of 60 minutes after the live broadcast starts is provided as follows:

```
<relatedVoD>
<MPDInfo>
        <interval>
                <startTime>PT0S</startTime>
                <endTime>PT60M</endTime>
        </interval>
        <MPDAddress>http://www.movie.com/Experience/
        exampleVoD_preMPD_URL.mpd</MPDAddress>
</MPDInfo>
</relatedVoD>
```

Alternatively, each Video on Demand MPD includes only media presentation description information for a 30-minute time period, and therefore media presentation information for two previous time periods needs to be included. An example is as follows:

```
<relatedVoD>
<MPDInfo>
        <interval>
                <startTime>PT0S</startTime>
                <endTime>PT30M</endTime>
        </interval>
        <MPDAddress>http://www.movie.com/Experience/
        exampleVoD_preMPD1_URL.mpd</MPDAddress>
</MPDInfo>
<MPDInfo>
        <interval>
                <startTime>PT30M</startTime>
                <endTime>PT60M</endTime>
        </interval>
        <MPDAddress>http://www.movie.com/Experience/
        exampleVoD_preMPD2_URL.mpd</MPDAddress>
</MPDInfo>
</relatedVoD>
```

Assuming that the total duration of live media presentation is 4 hours (its start time is "2010-05-01T18:00:00 Z"), Video on Demand media presentation information corresponding to the whole live media presentation may be provided at the same time, but availability time needs to be included. An example is as follows:

```
<relatedVoD>
<MPDInfo>
        <interval>
            <startTime>PT0S</startTime>
            <endTime>PT60M</endTime>
        </interval>
<MPDAddress>http://www.movie.com/Experience/
exampleVoD_preMPD_URL.mpd</MPDAddress>
</MPDInfo>
<MPDInfo availablilityStart="2010-05-01T22:00:00Z">
        <interval>
            <startTime>PT0S</startTime>
            <endTime>PT4H</endTime>
        </interval>
<MPDAddress>http://www.movie.com/Experience/
exampleCompleteVoD_MPD_URL.mpd</MPDAddress>
</MPDInfo>
</relatedVoD>
```

The live broadcast server and the Video on Demand server may be deployed separately or on the same server as required.

706: The client requests the MPD for a corresponding time period from the Video on Demand server.

707: The Video on Demand server returns the MPD corresponding to the request to the client.

The client processes the received Video on Demand MPD to obtain a corresponding playlist and acquire the URL address of a media segment, and adds the obtained playlist to the playlist locally maintained (or replaces and updates the playlist locally maintained).

708: The client requests a media segment from the Video on Demand server.

The client first constructs a corresponding media segment request according to the moment of the media segment to be requested in step 705, and sends it to the Video on Demand server.

709: The Video on Demand server returns the media segment corresponding to the request to the client.

The Video on Demand server returns the media segment corresponding to the request.

Then, the client may sequentially request media segments following this media segment until the user performs another play control operation, all media segments in the playlist are requested and played, or an MPD update occurs. Therefore, steps 708 and 709 may be repeated multiple times according to the implementation situation.

In Embodiment 7, a live MPD request message is sent to a live broadcast server; a response message that includes the MPD for the current time period and is returned by the live broadcast server is received, where the MPD further includes Video on Demand media presentation information for another time period; a media segment to be requested currently is determined to exceed the time range corresponding to the live MPD, and the media presentation information corresponding to the media segment to be requested currently is determined according to the Video on Demand media presentation information for another time period; the corresponding Video on Demand MPD is acquired according to the media presentation information corresponding to the media segment to be requested currently, and the media segment to be requested currently is requested from a Video on Demand server according to the acquired corresponding MPD. In this manner, the client supports playback of a larger time range, and at the same time, the size of the MPD is capable of remaining in an acceptable range.

In Embodiment 8a, the MPD provides not only live media presentation information for another time period that is in the live broadcast time shift range but not included in the currently latest MPD but also Video on Demand media presentation information for a previous time period corresponding to live media presentation (that is, the MPD includes elements <previousMPD> and <relatedVoD> at the same time). The client may select, according to the moment of a media segment to be requested, media presentation information satisfying a time period requirement, obtain the corresponding MPD, and request and play the corresponding media segment. For the process in this embodiment, reference may be made to Embodiment 6 and Embodiment 7, and details are not provided herein.

Embodiment 8

In another actual application process, for example, during a live broadcast process, a user performs, for example, a pause or time shift operation, and then continues the watching. In this situation, the expiration time for a live broadcast server to provide services has been exceeded, and therefore the live broadcast server cannot continue to provide services. A client may switch, using MPD including related Video on Demand media presentation information, to the Video on Demand service to continue the watching. For details, refer to the description in the following embodiment.

Figure 8:
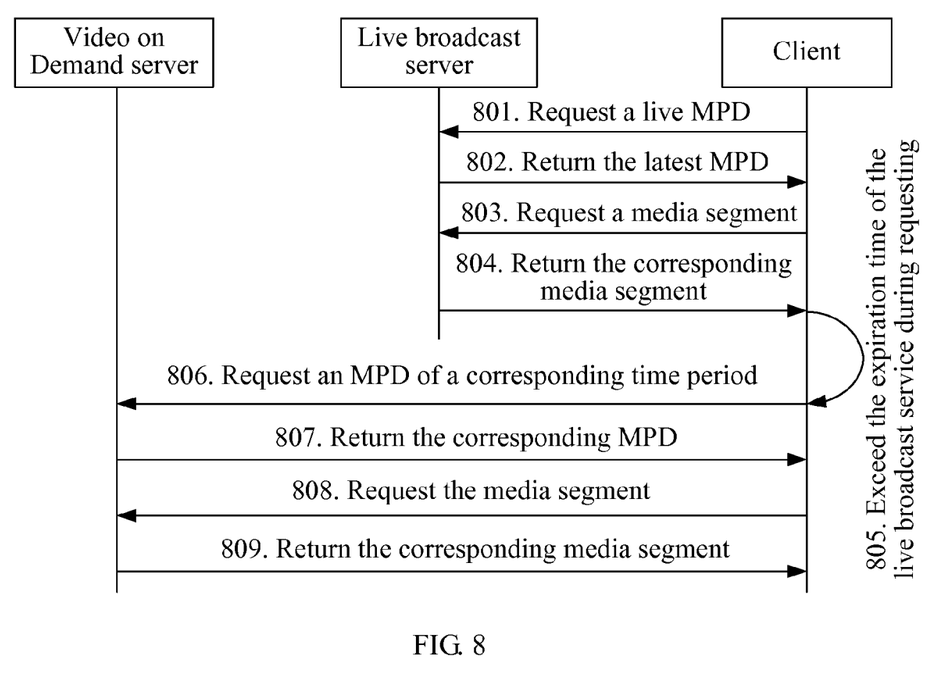
FIG. 8 is a flow chart of specific implementation of a method for seamless switching between live broadcast and Video on Demand in an adaptive HTTP streaming transmission solution according to an embodiment of the present invention.

Referring to FIG. 8, the embodiment of the present invention provides a method for seamless switching between live broadcast and Video on Demand in an adaptive HTTP streaming transmission solution, involving a client, a live broadcast server, and a Video on Demand server. The specific steps are as follows:

801: The client sends a live MPD request message to the live broadcast server.

The client requests acquisition of a live MPD, for example, constructs an MPD request message according to the URL address of the live MPD.

802: The live broadcast server returns the currently latest MPD.

At the same time, the MPD further includes Video on Demand media presentation information for another time period. Another time period herein may be classified into two cases:

(1) The client creates a local playlist completely based on the latest MPD currently acquired. In this case, a time period out of the time interval [a, b], for example, a time period before time point "a" for live broadcast, included in the current MPD, is referred to as another time period; and (2) the client creates a local playlist based on the latest MPD currently acquired, and further based on a time period included in an MPD previously acquired. A client that accesses after the live broadcast starts is capable of creating a playlist of all time periods within a range from the first MPD it received to the currently latest MPD it receives. Assuming that the range is the time interval [a', b] (wherein a'≤a), a time period out of the time interval [a', b] (for example, <a') is referred to as another time period. In another example, a live broadcast client had accessed when the live broadcast started, but a local playlist it maintains has a restriction on the total duration (for example, LocalListDuration). In this case, the time period it maintains is [b-LocalListDuration, b], and a time period out of this time period is referred to as another time period.

803: The client requests a media segment from the live broadcast server.

The client processes the live MPD to obtain a corresponding playlist and acquire the URL address of a media segment, and requests the media segment according to the URL address.

804: The live broadcast server returns the media segment to the client.

Herein, steps 801 and 802 and steps 803 and 804 may be repeated multiple times according to the implementation situation.

805: After the client performs a pause or time shift operation, the expiration time of the live broadcast service is exceeded when the media segment is requested again. Determine, according to the media presentation information for another time period provided in the MPD, the media presentation information corresponding to the media segment to be requested currently.

The detailed processing step is greatly similar to step 705 in FIG. 7, and the difference lies in the following:

(1) The media segment request of the client is not directly related to the progress of the live broadcast (because the live broadcast has been completed). The media segment request is directly related to media presentation, that is, an offset time value from the start time of the media presentation; and (2) if the MPD includes Video on Demand media presentation information of complete media presentation, the complete media presentation is available at present.

806: The client requests Video on Demand MPD for a corresponding time period from the Video on Demand server.

807: The Video on Demand server returns the MPD corresponding to the request to the client.

The client processes the received Video on Demand MPD to obtain a corresponding playlist and acquire the URL address of a media segment, and adds the obtained playlist to the playlist locally maintained (or replaces and updates the playlist locally maintained).

808: The client requests a media segment from the Video on Demand server.

The client first constructs a corresponding media segment request according to the moment of the media segment to be requested in step 805, and sends it to the Video on Demand server.

809: The Video on Demand server returns the media segment corresponding to the request to the client.

The Video on Demand server returns the media segment corresponding to the request.

Then, the client may sequentially request media segments following this media segment until the user performs another play control operation, all media segments in the playlist are requested and played, or an MPD update occurs. Steps 808 and 809 may be repeated multiple times according to the implementation situation.

In Embodiment 8, a live MPD request message is sent to a live broadcast server; a response message that includes the MPD for the current time period and is returned by the live broadcast server is received, where the MPD further includes Video on Demand media presentation information for another time period; it is determined that the expiration time of the live broadcast service corresponding to the MPD has been exceeded when a media segment is to be requested currently, and the media presentation information corresponding to the media segment to be requested currently is determined according to the Video on Demand media presentation information for another time period; the corresponding Video on Demand MPD is acquired according to the media presentation information corresponding to the media segment to be requested currently, and the media segment to be requested currently is requested from the media server according to the acquired corresponding MPD. In this manner, after the expiration time for the live broadcast server to provide services is exceeded because the client performs, for example, a pause or time shift operation, the client is capable of performing seamless switching from the live broadcast to Video on Demand and continuing to provide media services.

According to the description of the preceding embodiments, persons of ordinary skill in the art should understand that all or a part of the steps of the methods in the embodiments may be implemented by a program instructing relevant hardware. The program may be stored in a computer readable storage medium. When the program runs, the steps of the methods in the embodiments are performed. The storage medium may be a read-only memory (ROM), a random-access memory (RAM), magnetic disk, an optical disk, and the like.

The foregoing descriptions are merely exemplary embodiments of the present invention, but not intended to limit the present invention. Any variation or replacement made by persons skilled in the art without departing from the spirit of the present invention shall fall within the protection scope of the present invention. Therefore, the protection scope of the present invention shall be subject to the appended claims.

What is claimed is:

1. A method for supporting time shift playback in a client device for Hypertext Transfer Protocol (HTTP) streaming transmission, comprising:
   sending a live media presentation description (MPD) request message to a media server;
   receiving a response message returned from the media server that comprises a first MPD for a current first time period, wherein the first MPD comprises media presentation information for other time periods, and wherein the media presentation information comprises a second time period and an address of a second MPD for the second time period;
   determining that a moment of a media segment to be requested currently exceeds a time range corresponding to the first MPD;
   determining, according to the second time period in the first MPD, the address of the second MPD for the second time period comprised in the media presentation information corresponding to the media segment to be requested currently;
   acquiring the second MPD according to the address of the second MPD; and
   requesting, from the media server according to the acquired second MPD, the media segment to be requested currently.

2. The method according to claim 1, wherein the second time period comprises at least one of the following:
   a time period exceeding the current time period and in a time shift range that is maintained by the media server;
   a time period after live media presentation starts and exceeding a time shift range that is maintained by a live broadcast server; and
   a time period exceeding expiration time of providing a live broadcast service after playing is restored from a pause state or during time-shift watching.

3. The method according to claim 1, wherein the media presentation information for the other time periods further comprises availability time of the second MPD.

4. The method according to claim 1, wherein when multiple pieces of media presentation information corresponding to the other time periods exist, the method further comprises:
   judging whether the multiple pieces of media presentation information corresponding to the other time periods and satisfying a time requirement of the media segment to be requested exist in the first MPD; and selecting, according to a selection policy, one of the multiple pieces of media presentation information corresponding to the other time periods when it is judged that the multiple pieces of media presentation information corresponding to the other time periods and satisfying the time requirement of the media segment to be requested exist in the first MPD.

5. The method according to claim 4, wherein the one of the multiple pieces of media presentation information corresponding to the other time periods selected according to the selection policy, wherein the current time period needs to satisfy a requirement of an availability time when the media presentation information comprises the availability time, wherein the piece of media presentation information corresponding to the time period with a lowest overlap ratio to the time period of a local playlist maintained by the client device is selected when time periods corresponding to the media presentation information overlap, and wherein a piece of media presentation information is selected randomly when time periods corresponding to several pieces of media presentation information do not overlap with the time period of the local playlist or the overlap ratios of time periods corresponding to several pieces of media presentation to the time period of the local playlist are the same.

6. The method according to claim 1, wherein the acquired second MPD comprises:
   a live MPD for the other time periods exceeding the time period corresponding to the current first MPD and in a time shift range that is maintained by the media server, wherein the live MPD is acquired from a live broadcast server; and/or
   a Video on Demand MPD for the other time periods exceeding a time range that is maintained by a live broadcast server, wherein the Video on Demand MPD is acquired from a Video on Demand server.

7. The method according to claim 6, wherein the Video on Demand MPD corresponding to the current live media presentation comprises:
   a Video on Demand MPD comprising part of time periods of the live media presentation; or
   a complete Video on Demand MPD comprising the whole time range of media presentation.

8. A client device for Hypertext Transfer Protocol (HTTP) streaming transmission, comprising:
   a sending module configured to send a live media presentation description (MPD) request message to a media server;
   a receiving module configured to receive a response message returned from the media server that comprises a first MPD for a current first time period, wherein the first MPD further comprises media presentation information for other time periods, and wherein the media presentation information comprises a second time period and an address of a second MPD for the second time period;
   a determining module configured to determine that a moment of a media segment to be requested currently exceeds a time range corresponding to the first MPD, and determine, according to the second time period in the first MPD, the address of the second MPD for the second time period comprised in the media presentation information corresponding to the media segment to be requested currently; and
   an acquiring module configured to acquire the second MPD according to the address of the second MPD, and request, from the media server according to the acquired second MPD, the media segment to be requested currently.

9. The client device according to claim 8, wherein the client device further comprises a selecting module, wherein the current time period needs to satisfy a requirement of an availability time when the media presentation information comprises the availability time, wherein the piece of media presentation information corresponding to the time period with a lowest overlap ratio to the time period of a local playlist maintained by the client device is selected when time periods corresponding to the media presentation information overlay, and wherein a piece of media presentation information is selected randomly when time periods corresponding to several pieces of media presentation information do not overlap with the time period of the local playlist or the overlap ratios of time periods corresponding to the several pieces of media presentation to the time period of the local playlist are the same.

* * * * *

UNITED STATES PATENT AND TRADEMARK OFFICE
CERTIFICATE OF CORRECTION

PATENT NO. : 8,683,071 B2
APPLICATION NO. : 13/768002
DATED : March 25, 2014
INVENTOR(S) : Peiyu Yue et al.

It is certified that error appears in the above-identified patent and that said Letters Patent is hereby corrected as shown below:

In the Claims

Column 19, line 10, claim 5 should read "corresponding to the other time periods is selected according to the"

Signed and Sealed this
Third Day of June, 2014

Michelle K. Lee
*Deputy Director of the United States Patent and Trademark Office*